Sept. 18, 1962   F. P. CATALFANO ETAL   3,054,126
METHOD OF MAKING SHOES
Filed Aug. 17, 1961

Inventors
Frank P. Catalfano
Lionel Rodrigues
by Roberts, Cushman & Grover
Attys United States Patent Office 3,054,126
Patented Sept. 18, 1962

3,054,126
METHOD OF MAKING SHOES
Frank P. Catalfano, Warren, R.I., and Lionel Rodriques, Fall River, Mass., assignors, by mesne assignments, to Marbill Company, Providence, R.I., a corporation of Rhode Island
Filed Aug. 17, 1961, Ser. No. 132,093
6 Claims. (Cl. 12—142)

This invention relates to shoe manufacture and more especially to shoes having sponge rubber or rubber-like inner soles and to a method of manufacturing the same.

According to the common method of making fabric shoes with rubber soles, extensively known as tennis shoes or sneakers, a fabric upper is lasted over a metal last and an unvulcanized rubber sole is assembled with the upper and the last, whereupon the assembly is placed in a vulcanizing chamber and the parts united by vulcanization. Sponge insoles for shoes of this type have been heretofore provided by coating a foamable, unvulcanized rubber layer onto a sheet of fabric, passing the coated fabric under tension over a heated drum to foam and vulcanize the rubber, and cutting the insole member from the cured sheet. The insole member was then applied to the bottom of the metal last, the upper and outer sole assembled thereon, and the shoe vulcanized. Where desired, a sponge arch support has been cut to the desired tapered form from a sheet of sponge rubber and the support or "cookie" assembled on the last at the arch portion between the insole and the outer sole.

The principal object of the present invention is to provide an improved method of making shoes of the above type with sponge insoles. Further objects include provision of a method for production of shoes at lower cost, which permits re-use of waste material occasioned by cutting insole members from sheet stock; which provides more uniform soles; and which simplifies the provision and inclusion of an arch support or cookie where desired.

In accordance with the present invention, the method comprises providing an embryo insole member cut from sheet material having a flexible backing layer and a layer of uncured, foamable elastomeric material, assembling said embryo insole member on a last with an upper and a fusible, elastomeric outer sole, and while on said last and in the absence of an outer confining mold for the outer sole, fusing the sole structure and simultaneously expanding the foamable insole to sponge the same during vulcanization. Preferably, the fabric or flexible backing layer of the embryo insole is provided with a resinous coating which substantially seals the pores thereof on the face to which the foamable rubber is applied. By substantially sealing the pores, it is meant that the pores are so sealed that the rubber layer, on foaming, expands away from and not through the fabric layer. It is not necessary that the fabric be so coated as to be completely impervious to gas or liquid.

Where desired, a sponge arch support or cookie is provided by preparing a sheet layer of foamable, unvulcanized rubber, preferably softer than the insole foam layer, and by cutting blanks of the desired contour therefrom. These blanks are of substantially uniform thickness and are applied between the insole and the outer sole on the last and foamed during final vulcanization together with the sponge insole layer.

The invention will now be described in greater detail with reference to the accompanying drawings wherein.

Figure 1:
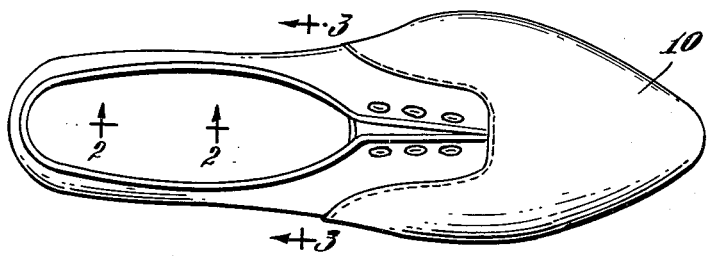
FIG. 1 is a plan view of a shoe made in accordance with the present invention.
Figure 2:
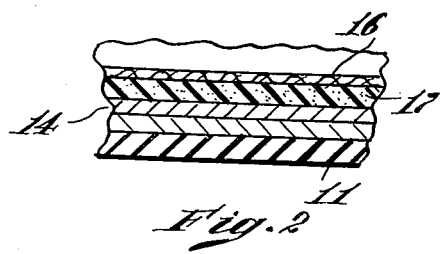
FIG. 2 is a section, to enlarged scale, on the line 2—2 of FIG. 1.
Figure 3:
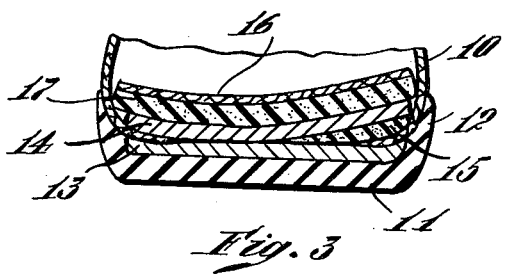
FIG. 3 is a section, to enlarged scale, on the line 3—3 of FIG. 1.

Referring to the drawings, FIGS. 1 to 3 show a shoe comprising a fabric upper 10, a rubber outer sole 11 including a marginal foxing strip 12, rubber rag-stock filler plies 13 and 14, a sponge arch support member or cookie 15, and an insole comprising upper fabric layer 16 and sponge rubber inner layer 17.

Figure 4:
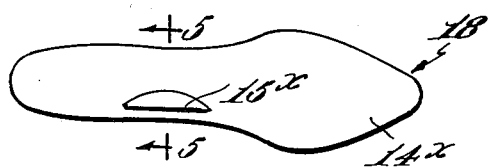
FIG. 4 is a bottom view of an embryo insole.
Figure 5:
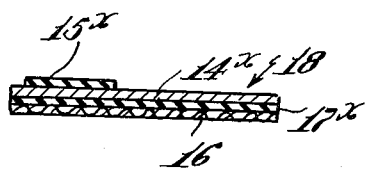
FIG. 5 is an enlarged section of the line 5—5 of FIG. 4.

FIGS. 4 and 5 illustrate an embryo insole member 18 comprising a fabric backing 16, a layer of foamable unvulcanized rubber 17x, and, in addition, rag-stock layer 14x and embryo cookie layer 15x.

The embryo insole member 18 is prepared as follows. Preferably, the layer of fabric is impregnated with a resinous coating to substantially seal the pores thereof. This coating serves to stiffen the fabric backing 16 and to prevent rubber layer 17x from expanding through the pores of the backing when it foams. This stiffening and sealing are important in preventing the insole from being displaced, wrinkled or unevenly sponged as the sponge layer expands on the last during vulcanization. It is not necessary that foam layer 16 be completely sealed so as to be impermeable to gases and liquids. Suitable fabric backings are, for example, a 2.85 cotton sheeting or a 2.2 cotton drill, the numbers referring to the yards of cloth per pound. A suitable impregnating resin is a high styrene, styrene-butadiene synthetic copolymer latex having a relatively high viscosity, for example Vulcanol 4878 of the Alco Oil and Chemical Corporation of Philadelphia, Pennsylvania, a copolymer formulation having a viscosity of 11,000 cps. This latex is applied to the fabric in any suitable way, for example by a knife or roll coater, in an amount sufficient to substantially close the pores of the fabric against penetration by expanding foam, and the impregnated fabric thereafter dried. Other suitable impregnating resins well-known in the art which provide adhesion between the fabric and the subsequently applied foamable rubber coating can also be employed.

The impregnated fabric is thereafter coated with a foamable but unvulcanized rubber layer 17x in sufficient thickness to give the final desired thickness of foam. Optionally, a layer of rubber rag-stock is normally incorporated in the shoe sole structure to give body and stiffness to the same at minimum cost. This rag-stock can comprise one or more layers as desired, and it has been found convenient, in accordance with the present invention, to provide one such layer on the insole member 18 and other layer at the inner side of outer sole 11. The coated sheet material comprising layers 16, 17x and 14x is then cut to the desired contour, for example by die cutting, to give the embryo insole member 18.

Another layer of sheet rubber, foamable by incorporation of gas generating agents and unvulcanized, is prepared and arch support or cookie member 15x cut therefrom. Since these members are unvulcanized, they are tacky and may simply be pressed onto embryo insole member 18 at the desired location. Embryo support 15x is preferably of softer rubber composition than layer 17x so that it will flow somewhat on the last during vulcanization to give the desired cross-section and contour as shown in FIG. 3.

Suitable rubber compositions for foamable layer 17x and for the cookie 15x are given below as Examples 1 and 2 respectively, wherein all parts are by weight. Other similar rubber compositions well-known in the art can also be employed.

Example 1

Rubber:
- Natural 4X brown crepe _____ 50.0
- Natural pure gum reclaim _____ 28.5
- Synthetic GRS _____ 27.0

Factice _____ 4.0
Plasticizer _____ 8.0

Filler:
- Clay _____ 60.0
- Diatomaceous earth _____ 10.0

Stearic acid _____ 1.0
Zinc oxide _____ 4.0
Anti-oxidant [1] _____ 0.26
Salicylic acid _____ 0.6

Accelerator:
- Santo-Cure [2] _____ 0.36
- Diphenylguanidine _____ 0.1

Sulfur _____ 1.8

Blowing agent:
- Opex 40 [3] _____ 5.0

Blowing agent activator:
- RIA [4] _____ 1.0

[1] Flextol H, polymerized 1,2-dihydro-2,2,4-trimethylquinoline.
[2] N-cyclohexyl-2-benzothiazole sulfenanide.
[3] 40% dinitrosopentanethylenetetramine in an inert filler.
[4] 66.6% urea dispersed in oil.

Example 2

Rubber:
- Natural 4X brown crepe _____ 130
- Natural pure gum reclaim _____ 57
- Reclaimed synthetic GRS _____ 24

Factice _____ 12
Plasticizer _____ 27

Filler:
- Calcium carbonate _____ 110
- Diatomaceous earth _____ 30

Salicylic acid _____ 1.2
Stearic acid _____ 6
Zinc oxide _____ 9
Flectol H _____ 0.52

Accelerator:
- Santo-Cure _____ 0.72
- Diphenylguanidine _____ 0.2

Blowing agent:
- Sodium bicarbonate _____ 13.5
- Opex 40 _____ 5.0
- RIA _____ 1.2

Sulfur _____ 3.6

The shoe is assembled and vulcanized as follows. The embryo insole member 18, with arch support cookie 15x in place, is placed on the bottom of the last 19 (FIG. 6) with the fabric 16 against the bottom of the last. Cloth upper 10, assembled in any desired manner, for example by stitching, is then secured to the last with its lower marginal edge engaging the bottom surface of the embryo insole assembly. Unvulcanized rubber outer sole 11x, with foxing strip 12x, and bottom ply 13x of unvulcanized rubber rag-stock are then secured to the last, the assembly transferred to a vulcanizing oven and the sole structure vulcanized to cure the rubber, seal the parts together, and simultaneously expand foam layer 17x and cookie 15x in place during the final vulcanization.

Figure 6:
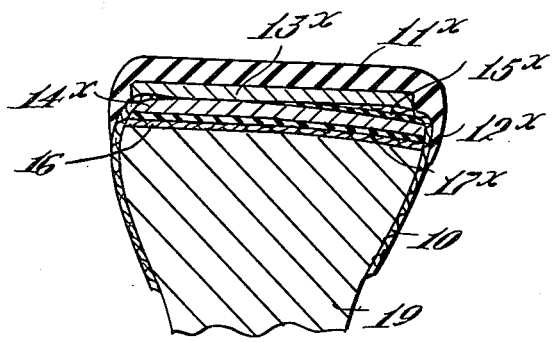
FIG. 6 is a sectional view similar to FIG. 3, but illustrating the assembly of the parts on a last prior to vulcanization and foam expansion.

Shoes have been successfully vulcanized as follows. A plurality of lasted shoes as shown in FIG. 6 are placed in a vulcanizing oven, the lasted shoes being vulcanized in the absence of a confining outer sole mold, and the shoes vulcanized at a temperature of 270° F. under 30 p.s.i. air pressure. In one suitable procedure, the lasted shoes are placed in the oven at room temperature and at atmospheric pressure, the oven closed, heat and pressure so applied as to provide the desired temperature in about fifteen minutes and the desired pressure in about five minutes. With this procedure, it has been found that blisters in the sole structure are avoided.

From the foregoing description it can be observed that the present invention eliminates the previous step of blowing the insole rubber layer on a heated drum; the sheet material remaining after embryo insoles are cut therefrom can be reused, for example as rag-stock, since it is unvulcanized; that more uniform outer sole structure and surface is obtained since the blowing of the sponge in situ compensates for non-uniform lasts and lasting procedures; and that a substantially simplified cookie procedure is provided.

It should be understood that the foregoing description is for the purpose of illustration only and that the invention includes all modifications and equivalents falling within the scope of the appended claims.

We claim:

1. The method of making shoes having an elastomeric outer sole and a sponge insole which comprises, providing an embryo insole member cut from sheet material having a flexible backing layer and a layer of uncured, foamable elastomeric material, assembling said embryo insole member on a last with an upper and a fusible, elastomeric outer sole, and, while on said last and in the absence of a confining outer mold for the outer sole, fusing said sole structure and simultaneously expanding said foamable insole layer to form a sponge.

2. The method according to claim 1, wherein said foamable elastomeric material and said fusible outer sole comprise rubber.

3. The method according to claim 2, wherein said embryo insole member is provided having a fabric backing layer adapted to form the inner surface of the sole structure, a resinous coating on said fabric, and a foamable, unvulcanized rubber layer over said resinous coating.

4. The method according to claim 1, wherein a second layer of foamable, unvulcanized rubber adapted to form a raised arch support in the sole structure is placed between said embryo inner sole and said outer sole at the arch portion of the sole, said second layer being foamed during vulcanization.

5. The method according to claim 4, wherein said second rubber layer is soft so as to flow during vulcanization.

6. The method of making shoes having a rubber outer sole and a sponge rubber insole which comprises, providing sheet material having a fabric layer adapted to form the inner surface of the sole, a resinous coating substantially sealing the pores of one surface of said fabric, and a foamable, unvulcanized rubber coating over said resinous coating, cutting an embryo insole from said sheet material to the desired edge contour, applying a second layer of foamable, unvulcanized rubber at the arch portion only of said embryo insole on the side opposite said fabric layer, said additional layer being of substantially uniform thickness and being adapted, on foaming, to form a raised arch support for said shoe, assembling said embryo insole on a last together with a shoe upper and an outer sole, and, while on said last and in the absence of a confining outer mold, vulcanizing the sole structure and simultaneously foaming said foamable layers.

References Cited in the file of this patent

UNITED STATES PATENTS

| | | |
|---|---|---|
| 1,400,143 | Dial | Dec. 13, 1921 |
| 2,409,594 | Sherman | Oct. 15, 1946 |
| 2,789,295 | Rollman et al. | Apr. 23, 1957 |
| 2,940,096 | Bromfield | June 14, 1960 |